(12) United States Patent
Biel et al.

(10) Patent No.: US 10,048,164 B2
(45) Date of Patent: *Aug. 14, 2018

(54) METHOD FOR AUTOMATED IN-LINE DETERMINATION OF CENTER THICKNESS OF AN OPHTHALMIC LENS

(71) Applicant: Novartis AG, Basel (CH)

(72) Inventors: Roger Biel, Aschaffenburg (DE); Matthias Schwab, Amorbach (DE)

(73) Assignee: Novartis AG, Basel (CH)

( * ) Notice: Subject to any disclaimer, the term of this patent is extended or adjusted under 35 U.S.C. 154(b) by 231 days.

This patent is subject to a terminal disclaimer.

(21) Appl. No.: 14/038,071

(22) Filed: Sep. 26, 2013

(65) Prior Publication Data

US 2014/0091016 A1    Apr. 3, 2014

Related U.S. Application Data

(60) Provisional application No. 61/707,212, filed on Sep. 28, 2012.

(51) Int. Cl.
  G01B 11/06 (2006.01)
  G01M 11/02 (2006.01)
(52) U.S. Cl.
  CPC ..... G01M 11/0271 (2013.01); G01B 11/0675 (2013.01); Y10T 29/54 (2015.01)
(58) Field of Classification Search
  CPC .............. G01B 9/02049; G01B 9/0205; G01B 11/0675; G01N 2021/0357;

(Continued)

(56) References Cited

U.S. PATENT DOCUMENTS 5,309,214 A    5/1994  Hashimoto
5,500,732 A    3/1996  Ebel et al.
(Continued)

FOREIGN PATENT DOCUMENTS

WO    2007017138 A1    2/2007
WO    2008080074 A2    7/2008

OTHER PUBLICATIONS

PCT International Search Report dated Mar. 6, 2014, International Application No. PCT/EP2013/070063, International Filing Date Sep. 26 2013.

(Continued)

*Primary Examiner* — Shawn Decenzo
(74) *Attorney, Agent, or Firm* — Robert A. Ambrose

(57) ABSTRACT

A method for automated in-line determination of the center thickness of an ophthalmic lens including providing an inspection cuvette (2) having an optically transparent bottom (21) and a concave inner surface (210) and containing the lens immersed in a liquid, providing an interferometer having a light source and a focusing probe (30) focusing light coming from the light source to a set position (310) of the lens. Focusing probe (30) also directs light reflected at the boundary between the back surface of the lens and the liquid as well as light reflected at the boundary between the front surface of the lens and the liquid or at the boundary between the front surface of the lens and the concave inner surface (210) to a detector of the interferometer. The center thickness of the lens is determined using the light reflected at the respective boundary at the back surface and at the front surface of the lens.

9 Claims, 3 Drawing Sheets

(58) Field of Classification Search
CPC ......... G01M 11/0207; G01M 11/0214; G01M 11/0242; G01M 11/0235; G01M 11/025; G01M 11/0278
See application file for complete search history.

(56) References Cited

U.S. PATENT DOCUMENTS

| | | | |
|---|---|---|---|
| 5,675,406 A * | 10/1997 | Hollmann et al. | 356/124 |
| 5,825,476 A | 10/1998 | Abitol et al. | |
| 5,847,819 A | 12/1998 | Yanagi | |
| 6,909,503 B2 * | 6/2005 | Baske et al. | 356/246 |
| 7,423,747 B2 * | 9/2008 | Biel et al. | 356/246 |
| 7,560,711 B2 * | 7/2009 | Hegazi | 250/461.1 |
| 7,652,756 B2 * | 1/2010 | Suppel-Adrian et al. | 356/36 |
| 7,990,531 B2 * | 8/2011 | Clements et al. | 356/239.2 |
| 2009/0262333 A1 * | 10/2009 | Hall | 356/51 |
| 2011/0292379 A1 | 12/2011 | Kato | |
| 2012/0241989 A1 | 9/2012 | Sugimoto | |

OTHER PUBLICATIONS

PCT Written Opinion of the International Searching Authority dated Mar. 6, 2014, International Application No. PCT/EP2013/070063, International Filing Date Sep. 26 2013.
Authors: I. Verrier, C. Veillas, and T. Lépine Article: Low Coherence Interferometry for Central Thickness Measurement of Rigid and Soft Contact Lenses Published: Optics Express, vol. 17, No. 11, pp. 9157-9170.
Authors: I. Verrier, C. Veillas, and T. Lépine Article: Influence of Interfaces Reflectivity for Central Thickness Measurement of a Contact Lens by Low Coherence Interferometry Published: Journal of the European Optical Society, Rapid Publications, vol. 8, No. 13006, (2013), pp. 13006-1 to 13006-4.

* cited by examiner

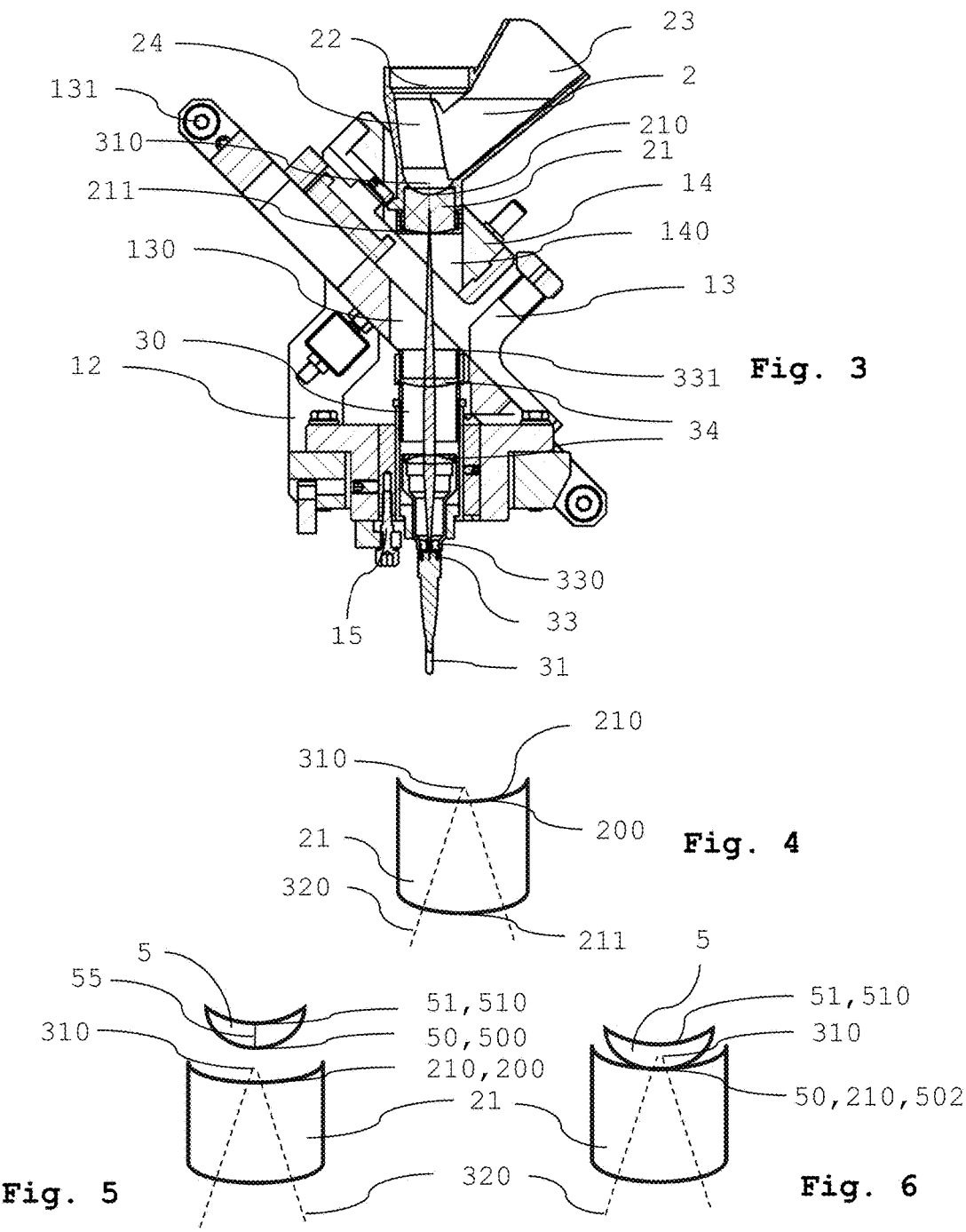

METHOD FOR AUTOMATED IN-LINE DETERMINATION OF CENTER THICKNESS OF AN OPHTHALMIC LENS

This application claims the benefit under 35 USC § 119 (e) of U.S. provisional application Ser. No. 61/707,212 filed Sep. 28, 2012, incorporated herein by reference in its entirety.

TECHNICAL FIELD

The present invention relates to a method for an automated in-line determination of the center thickness of an ophthalmic lens.

BACKGROUND

The manufacturing of ophthalmic lenses, in particular of single wear soft contact lenses which are used only once and which are disposed of after use, may be performed in a fully automated manufacturing line with the aid of reusable molds. In order to ensure top quality of the so manufactured contact lenses, the contact lenses are optically inspected in-line in an inspection module of the fully automated manufacturing line for the presence of bubbles, edge defects, flaws or inclusions, etc., which would render the contact lenses unacceptable.

During set-up of the manufacturing line, for example before starting a new production lot, new molds are installed on them manufacturing line. Prior to starting "actual" production of contact lenses which are distributed to customers, a predetermined number of "dummy" contact lenses are produced with each of the newly installed molds in order to verify that the newly installed molds are properly arranged so that contact lenses are produced which have the desired specifications. The "dummy" contact lenses are inspected offline to make sure that the contact lenses manufactured with the newly installed molds have the desired specifications including center thickness of the contact lenses. Offline determination of the center thickness of the "dummy" contact lenses may be performed, for example, with the aid of an interferometer. After inspection, the "dummy" lenses are disposed of. Due to the large number of individual molds being present in the manufacturing line, several hundred of "dummy" contact lenses up to a few thousand of "dummy" contact lenses end up as waste even if they fulfill the desired specifications. More importantly, however, the time needed for producing and inspecting the predetermined number of "dummy" lenses prior to starting "actual" production of contact lenses which are distributed to customers may be up to a few hours during which no contact lenses are produced in the manufacturing line that are later on distributed to customers. It goes without saying that this negatively affects the efficiency of the manufacturing line. In addition, for maintaining top quality of the lenses distributed to the customers during "actual" production it is necessary to take samples of lenses out of the "actual" production process at predetermined time intervals in order to make sure that the lenses manufactured during "actual" production have desired specifications.

Therefore, it is an object of the invention to overcome the afore-mentioned disadvantages of the prior art and to suggest a method that greatly increases the efficiency of the manufacturing line during set-up, such as for example before starting a new production lot.

SUMMARY

According to one aspect of the present invention, there is provided a method for an automated in-line determination of the center thickness of an ophthalmic lens in an automated manufacturing line for ophthalmic lenses. The method comprises the steps of:

providing an inspection cuvette comprising an optically transparent bottom having a concave inner surface and containing the ophthalmic lens immersed in a liquid, and positioning the inspection cuvette at a first inspection location of an inspection module of the automated manufacturing line;

providing an interferometer comprising a light source and a focusing probe, the focusing probe focusing light coming from the light source to a set position of the ophthalmic lens at the center of the concave inner surface of the optically transparent bottom of the inspection cuvette, and the focusing probe further directing light reflected at the boundary between the back surface of the ophthalmic lens and the liquid on the one hand as well as light reflected at the boundary between the front surface of the ophthalmic lens and the liquid or light reflected at the boundary between the front surface of the ophthalmic lens and the concave inner surface of the optically transparent bottom of the inspection cuvette on the other hand to a detector of the interferometer; and determining the center thickness of the ophthalmic lens from the signals generated at the detector by the light reflected at the respective boundary at the back surface and at the front surface of the ophthalmic lens.

Interferometric determination of the center thickness of the ophthalmic lens is performed in-line in the automatic manufacturing line while the ophthalmic lens is in the inspection cuvette. As mentioned earlier, the ophthalmic lens may in particular be a soft contact lens, and may especially be a soft contact lens made of or comprising a silicon hydrogel material without being limited thereto. The ophthalmic lens contained in the cuvette is the final lens intended for distribution to the customer. That is to say, the lens has passed all manufacturing steps including any extraction, hydration, coating and/or other additional manufacturing and/or treatment steps which may form part of the lens manufacturing process. Thus, there are no further manufacturing and/or treatment steps following the in-line inspection of the lens, so that the specifications of the inspected lens cannot be affected by any manufacturing and/or treatment steps since no such steps are performed after in-line inspection of the lens.

In-line inspection of the ophthalmic lenses in the manufacturing line highly increases the efficiency of the manufacturing line, since generally it is no longer necessary to produce any "dummy" lenses at all. Rather, the lenses previously produced as "dummy" contact lenses may be forwarded for packaging and distribution in case the result of the in-line inspection of the lenses in the manufacturing line is that the lenses fulfill the desired specifications. Thus, hours of time can be saved which were previously necessary to produce and offline inspect the "dummy" lenses. Also, the top quality standard of such a process is maintained or even improved, since the center thickness of each manufactured final lens is individually determined in-line.

The optically transparent bottom of the inspection cuvette has a concave inner surface. After the lens is inserted into the liquid contained in the inspection cuvette, for example with the aid of a gripper, it floats downwardly in the liquid with the front surface of the lens facing towards the concave bottom. As soon as the lens has settled down, it is positioned with its convex front surface at the center of the concave inner surface which forms the lowermost location of the concave inner surface of the bottom of the inspection cuvette. In this respect, it is to be noted that it is of no relevance whether or not the lens is inverted (i.e. turned inside out), since the center thickness of the lens remains the same. An inspection cuvette suitable for use in the method according to the invention is described, for example, in WO 2007/017138. The inspection cuvette can be tilted from a handling position, in which the lens can be inserted into and removed from the cuvette, to an inspection position, in which inspection of the lens may be performed, and vice versa.

Interferometers are well-known in the art. The interferometer used in the method according to the instant invention comprises a light source emitting light of low coherence, and a focusing probe which focuses light coming from the light source to a set position of the lens at the center of the concave inner surface of the optically transparent bottom of the inspection cuvette. The focusing probe further directs light reflected at the boundary between the back surface of the lens and the liquid to a detector of the interferometer. The reflected light is directed to interfere with reference light at the detector, and the resulting interference pattern is used for the determination of the center thickness of the ophthalmic lens. Determination of the thicknesses of small objects using interferometers is well-known in the art and is therefore not described in more detail. Interferometers suitable for use in the method according to the invention are commercially available. For example, an interferometer available under the name "OptiGauge" from the company Lumetrics, Rochester, N.Y., USA, may be used.

According to one aspect of the method according to the invention, the step of determining the center thickness of the ophthalmic lens comprises:

in case the ophthalmic lens rests on the concave inner surface of the optically transparent bottom of the inspection cuvette, selecting the signal generated by the light reflected at the boundary between the front surface of the ophthalmic lens and the concave inner surface of the optically transparent bottom of the inspection cuvette as well as the signal generated by the light reflected at the boundary between the back surface of the ophthalmic lens and the liquid;

in case the ophthalmic lens is floating at a distance above the concave inner surface of the optically transparent bottom of the inspection cuvette, selecting the signal generated by the light reflected at the boundary between the front surface of the ophthalmic lens and the liquid as well as the signal generated by the light reflected at the boundary between the back surface of the ophthalmic lens and the liquid.

As already mentioned above, "selecting the signal generated by the light reflected at the boundary" stands for selecting a signal which is the result of interference at the detector of the light reflected at the respective boundary with a reference light. In the first measurement scenario mentioned above, the ophthalmic lens rests on the concave inner surface of the bottom of the inspection cuvette. In this scenario light is reflected at the boundary between the front surface of the ophthalmic lens and the concave inner surface of the bottom of the inspection cuvette, since the lens rests on the surface and there is no liquid between the front surface of the lens and the concave inner surface at the location where the lens rests on the concave inner surface. Consequently, there is no boundary between the front surface of the lens and the liquid at the location where the lens rests on the surface (which corresponds to the center of the lens). In the second measurement scenario mentioned above, the ophthalmic lens is floating at a short distance above the concave inner surface of the bottom of the inspection cuvette, that is to say the lens does not rest on the concave inner surface. In this measurement scenario, there is a boundary between the front surface of the lens and the liquid and, accordingly, light is reflected at the boundary between front surface of the lens and the liquid resulting in a corresponding signal being present at the detector. Therefore, while in a fully automated manufacturing line both scenarios may occur it is advantageous that the method according to the invention is generally capable of handling both scenarios. In both scenarios there is a boundary between the back surface of the lens and the liquid, so that a corresponding signal is present at the detector. This signal is used in both scenarios for determining the center thickness of the lens. A preferred manner of how the two scenarios can be dealt with will be explained in the following.

According to another aspect of the method according to the invention, the step of determining the center thickness of the ophthalmic lens comprises counting a number of signals generated by the light reflected at the respective boundary, and for a counted number of two signals, selecting the two signals for determining the center thickness of the ophthalmic lens, for a counted number of three signals, ignoring the signal corresponding to the light reflected at the boundary between the concave inner surface of the optically transparent bottom of the inspection cuvette and the liquid, and selecting the remaining two signals for determining the center thickness of the ophthalmic lens.

This is one particular way how the afore-mentioned two scenarios can be handled. Regardless of whether the lens rests on the concave inner surface of the inspection cuvette or is floating at a distance above the inner concave surface, the counted number of signals is indicative of the respective scenario. In the scenario where the ophthalmic lens rests on the concave inner surface of the bottom of the inspection cuvette, only two signals will be present (there is no boundary between the inner concave surface of the bottom of the cuvette and the liquid and no boundary between the front surface of the lens and the liquid, since the lens rests on the inner concave surface). The center thickness of the ophthalmic lens is then determined from the two signals generated by the light reflected from the boundary between the front surface of the lens and the inner concave surface of the inspection cuvette on one hand, and by the light reflected at the boundary between the back surface of the lens and the liquid. In the scenario where the ophthalmic lens is floating at a short distance above the concave inner surface of the bottom of the inspection cuvette, a signal is generated by light reflected at the boundary between the concave inner surface of the bottom of the inspection cuvette and the liquid (the lens does not rest on the inner concave surface). In this scenario, this signal is irrelevant for determining the center thickness of the ophthalmic lens and is ignored. The remaining two signals generated by the light reflected at the boundary between the front surface of the lens and the liquid and at the boundary between the back surface of the lens and the liquid are selected for determining the center thickness of the lens.

According to a further aspect of the method according to the invention, the method further comprises the steps of comparing the determined center thickness of the ophthalmic lens with a predetermined set value for the center thickness, and identifying the ophthalmic lens as having an unacceptable center thickness if the determined center thickness is outside a predetermined range of tolerance around the predetermined set value for the center thickness, or identifying the ophthalmic lens as having an acceptable center thickness if the determined center thickness is within the predetermined range of tolerance around the predetermined set value for the center thickness, and removing the ophthalmic lens from the manufacturing line in case the ophthalmic lens has been identified as having an unacceptable center thickness, but further processing the ophthalmic lens in the manufacturing line in case the ophthalmic lens has been identified as having an acceptable center thickness.

Once a lens has been identified as having an unacceptable center thickness such lens cannot meet the quality standards and is removed from the manufacturing line. On the other hand all those lenses identified as having an acceptable center thickness are allowed to be further processed in the manufacturing line. However, this does not automatically mean that these lenses are distributed. Although they may remain in the manufacturing line they may include bubbles, edge defects, inclusions or other defects and may during further inspection be identified as being defective so that they are later on removed from the manufacturing line.

The range of tolerance may be chosen symmetrically around the predetermined set value for the center thickness. However, the range of tolerance may also be non-symmetrical around the set value for the center thickness for various reasons. For example, lenses having too low a center thickness may turn out to be fragile, while especially for lenses having negative diopters too high a center thickness would lead to too thick a lens edge that reduces the wearing comfort of the lens.

An ophthalmic lens identified as having an unacceptable lens thickness may not be removed from the manufacturing line immediately after the inspection cuvette is moved away from the first inspection location. It may also be stored as having an unacceptable central thickness in a central control unit, so that it can be removed from the manufacturing line at a later stage, however, in any event before being placed in a package.

According to another aspect of the method according to the invention, the method comprises the steps of:

providing a plurality of inspection cuvettes each inspection cuvette comprising an optically transparent bottom having a concave inner surface and containing an ophthalmic lens immersed in a liquid and positioning the plurality of inspection cuvettes at the first inspection location of the inspection module;

providing a plurality of focusing probes corresponding to the plurality of inspection cuvettes, each of the focusing probes focusing light to a set position of the ophthalmic lens at the center of the concave inner surface of the optically transparent bottom of a corresponding inspection cuvette, and each of the focusing probes directing light reflected at the respective boundary at the back surface and at the front surface of the respective ophthalmic lens to the receiving unit of the interferometer; and determining the center thickness of each of the ophthalmic lenses.

The advantages of the method as such are the same as already described above and will not be described again. In addition, in an automated manufacturing process it is advantageous to perform the method for a plurality of lenses together to enhance the efficiency (throughput) of the manufacturing line. In particular for a cyclic process, it is thus possible to inspect a plurality of lenses within one cycle of the process.

From a practical point of view, a number of focusing probes is assigned to a corresponding number of inspection cuvettes for performing interferometric measurements on a plurality of lenses. Each inspection cuvette of the plurality of inspection cuvettes contains a lens immersed in the liquid. The plurality of inspection cuvettes is preferably arranged and held in a common inspection cuvette holder. The plurality of focusing probes is fixedly arranged at the first inspection location, and the plurality of cuvettes is moved into the first inspection location. Only one interferometer including light source, detector, processing unit etc. is required for the plurality of interferometer probes and inspection cuvettes, as will be explained in more detail below. This is advantageous since an interferometer is an expensive component.

In one aspect of the method according to the invention, focusing light to a set position of the ophthalmic lens is performed sequentially for the plurality of inspection cuvettes. This is performed by directing light from the light source of the interferometer via a first focusing probe of the plurality of focusing probes to the set position of the ophthalmic lens in a first inspection cuvette of the plurality of inspection cuvettes. Subsequently light is directed from the light source of the interferometer via a second focusing probe to the set position of the ophthalmic lens in a second inspection cuvette and so on, until light from the light source of the interferometer is directed via a last focusing probe of the plurality of focusing probes to the set position of the ophthalmic lens in a last inspection cuvette of the plurality of inspection cuvettes.

By sequentially directing light onto the set position of the ophthalmic lens at a concave inner surface of the bottom of the inspection cuvette, interferometric determination of the thickness of each of the plurality of ophthalmic lenses may be performed very quickly one after another using only one single interferometer. In case of a cyclic process, it is preferred that all determinations be performed within one process cycle.

In a further aspect of the method according to the invention the step of sequentially focusing light to a set position of the ophthalmic lens for the plurality of inspection cuvettes comprises providing a plurality of deflectors corresponding to the plurality of focusing probes, the individual deflectors of the plurality of deflectors each being capable of being switched between an active state, in which the respective deflector directs light coming from the light source of the interferometer to the corresponding focusing probe and in which the respective deflector directs light reflected at the respective boundary surface to the detector of the interferometer, and a passive state, in which the respective deflector allows the light coming from the light source to pass to the next deflector which is in the active state and which is arranged in an optical path of the light, and sequentially switching a first deflector of the plurality of deflectors from the active state to the passive state after determining the center thickness of the ophthalmic lens contained in the first inspection cuvette, switching a second deflector of the plurality of deflectors from the active state to the passive state after determining the center thickness of the ophthalmic lens contained in the second inspection cuvette, and so on, until switching a second last deflector of the plurality of deflectors from the active state to the passive state after determining of the center thickness of the ophthalmic lens contained in the second last cuvette, and then determining the center thickness of the ophthalmic lens contained in the last inspection cuvette with the last deflector being in the active state.

In this variant, light from the light source of the interferometer is sequentially directed by the individual deflectors to the respective focusing probes, and light reflected at the respective boundary is directed to the detector of the interferometer as long as the deflector is in the active state. After being switched from the active to the passive state upon completion of the determination of the center thickness of the lens contained in the respective inspection cuvette, the center thickness of the lens contained in the "next inspection cuvette in the queue" is determined in the same manner with the respective deflector being in the active state, until the center thickness of the lens contained in the last inspection cuvette in the queue has been determined. It goes without saying, that it is also possible to start determination of the lens thickness for the lens contained in the "last inspection cuvette in the queue" with all preceding deflectors being deactivated, i.e. in the passive state, and with only the last deflector being in the active state, and then proceeding switching the second last deflector to the active state, etc., until the deflector of the first inspection cuvette in the queue has been switched to the active state and the center thickness of the first lens has been determined.

The deflectors may be embodied as small mirrors which can be rapidly switched mechanically from an active state to a passive state, or may alternatively be mirrors the transparency of which can be electronically activated or deactivated. For example, in case of mirrors which can be mechanically switched the mirrors can be tilted about an axis to be either in the active state or in the passive state. In case of electronically switchable mirrors, the transparency of the respective mirrors can be switched with the aid of a control voltage or a control current, as this is conventional in the art.

Switching can be performed with the aid of a commercially available multi-switch, such as for example the multi-switch LightBend™ Fiberoptic Switch manufactured by Agiltron, Inc., Woburn, Mass. 01801, United States of America, and available as Type LBMN183111300. This switching can be performed at a location remote from the location of the cuvettes and the light can be transported via optical fibers to the respective focusing probes. This is advantageous since it may be desirable to place the interferometer and other sensitive equipment at a location remote from the manufacturing line.

According to a further aspect of the method according to the invention, the method further comprises the steps of:

after determination of the center thickness of the ophthalmic lens contained in the inspection cuvette or after determination of the ophthalmic lenses contained in the plurality of inspection cuvettes, moving the inspection cuvette containing the ophthalmic lens or the plurality of inspection cuvettes containing the ophthalmic lenses from the first inspection location to a second inspection location, and at the second inspection location performing an in-line optical inspection of the ophthalmic lens contained in the inspection cuvette or of the ophthalmic lenses contained in the plurality of inspection cuvettes for the presence of other deficiencies. These other deficiencies may for example be edge defects, flaws, bubbles or inclusions, without this list being exhaustive. Such inspection may be performed in a conventional manner, for example with the aid of a CCD camera, so that this is not further described in detail here.

In accordance with a further aspect of the method according to the invention, the method further comprises the step of separately adjusting each focusing probe of the plurality of focusing probes so as to focus light coming from the light source of the interferometer to the corresponding set position of the concave inner surface of the optically transparent bottom of the respective inspection cuvette of the plurality of inspection cuvettes. This allows to fixedly install the focusing probes at the first inspection location and to individually adjust them to achieve optimum determination of the center thickness. This must be done only once at the set-up of the manufacturing line, since the inspection cuvettes always arrive at the first inspection location at the same position relative to the fixedly installed focusing probes, so that once the focusing probes are individually adjusted for optimum center thickness determination no readjustment is need. This is all the more the case since the adjustment of the focus of the respective focusing probe is not that critical.

A separate adjustment of each of the focusing probes allows a very precise and individual adjustment of a focusing probe relative to the inspection cuvette, for example in an inspection cuvette holder. Thereby, the focusing onto the set position of the ophthalmic lens at the center of the concave inner surface of the optically transparent bottom of each inspection cuvette is defined and adjusted very precisely. For an individual adjustment preferably the focusing probe is moved relative to the inspection cuvette and on a common translation axis.

According to a further aspect of the method according to the invention, the method is performed in an automated manufacturing line for manufacturing soft contact lenses.

Especially the manufacturing of soft contact lenses is a highly automated process. Therefore, performing the method according to the invention in the process of manufacturing soft contact lenses, the advantages as already described above are especially effective: The automatization is further supported by additionally improving the quality regime for the produced contact lenses. In addition, manufacturing time and stand-by time of the manufacturing line is saved.

According to another aspect of the present invention, there is provided an automated manufacturing line for manufacturing ophthalmic lenses, for example soft contact lenses. The manufacturing line comprises a production module for manufacturing ophthalmic lenses and an inspection module for inspecting the manufactured ophthalmic lenses. The inspection module is provided with a plurality of focusing probes being arranged at a first inspection location and being capable of being optically connected to an interferometer, for inspection of ophthalmic lenses being contained in a plurality of inspection cuvettes corresponding to the plurality of focusing probes. Each inspection cuvette comprises an optically transparent bottom having a concave inner surface and contains the ophthalmic lens immersed in a liquid. In operation the inspection module performs the method according to the invention.

The advantages of the automated manufacturing line have been described above with reference to the method according to the present invention and will therefore not be described again.

BRIEF DESCRIPTION OF THE DRAWINGS

In the following embodiments of the method according to the invention are described in more detail with reference to the accompanying drawings, wherein

FIG. 3 shows a cross section of a measurement setup with a focusing probe and an inspection cuvette;

FIGS. 4-6 are illustrations of different measurement situations, namely a cuvette bottom only (FIG. 4), an ophthalmic lens floating above the concave inner surface of the cuvette bottom (FIG. 5), and an ophthalmic lens in contact with the concave inner surface of the cuvette bottom (FIG. 6)

FURTHER DESCRIPTION OF EMBODIMENTS

Figure 1:
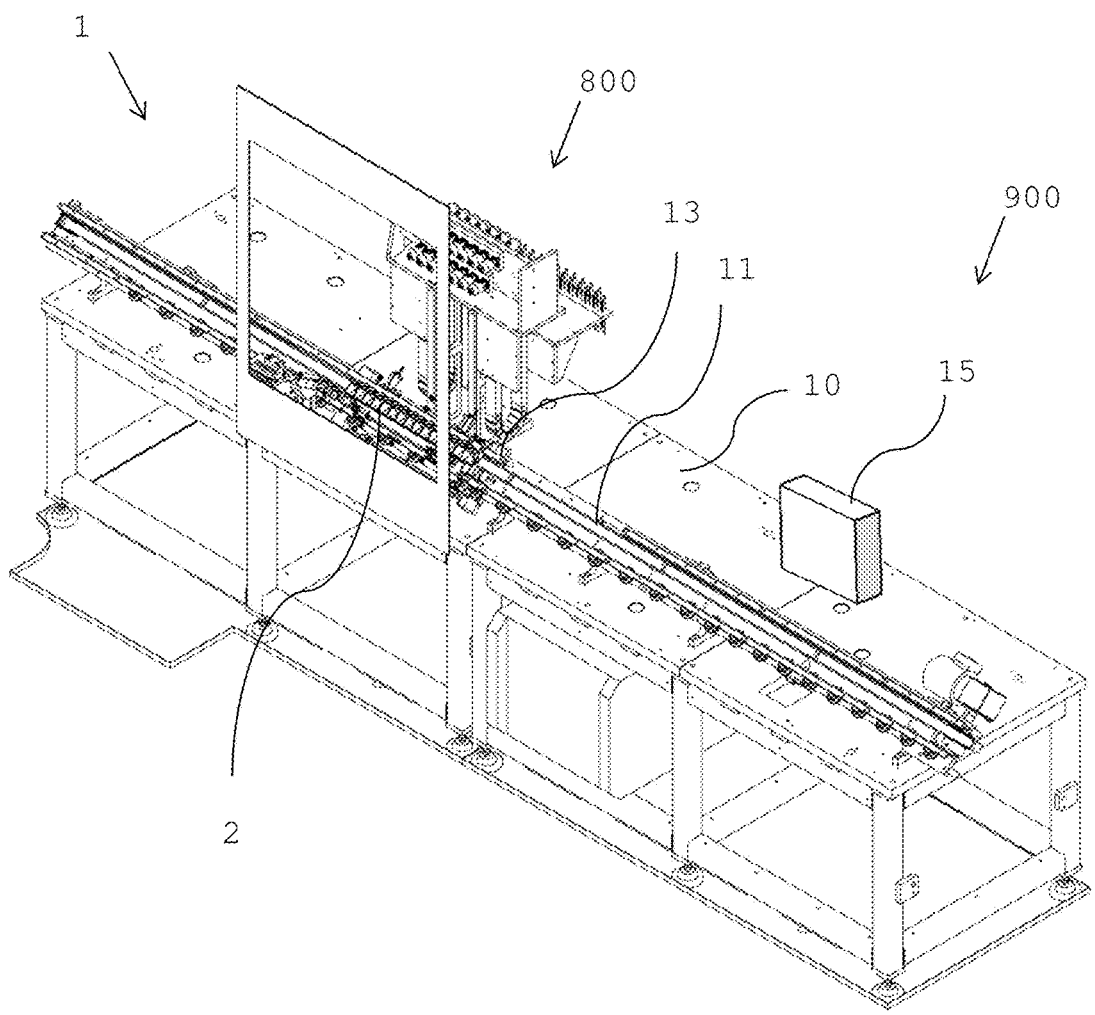
FIG. 1 shows a perspective top view of an inspection module of a manufacturing line for ophthalmic lenses including a plurality of inspection cuvettes.

In FIG. 1 an inspection module 1 (which may for example be part of an automated manufacturing line for ophthalmic lenses, preferably soft contact lenses) is shown. A rack 10 has a linear conveyor 11 arranged thereon for moving a plurality of inspection cuvettes 2 mounted to a carrier 13 along the rack 10. In FIG. 1, the inspection cuvettes 2 mounted to carrier 13 are arranged at a first inspection location 800. Interferometric measurement takes place at this first inspection location 800. Parts of the interferometric measurement equipment (not shown in FIG. 1, see FIG. 2) are arranged below the inspection cuvettes 2. The interferometer is preferably arranged at a location remote from rack 10 in order to minimize the influence of vibrations on the interferometric measurement. Vibrations may be generated, for example, by the handling processes transporting the contact lenses to, along, and from inspection module 1. Details of the interferometric measurement will be described further below.

Carrier 13 can be tilted from a horizontal position, in which the inspection cuvettes 2 are mounted to carrier 13 in the handling position in which the soft contact lenses may be inserted into and removed from inspection cuvettes 2, to a tilted position in which inspection cuvettes 2 are arranged in the inspection position, and vice versa. In the embodiment shown carrier 13 is in the tilted position and is moved along conveyor 11 in the tilted position (the cuvettes 2 are arranged in the inspection position).

After the interferometric measurement has been performed at first inspection location 800, carrier 13 together with the plurality of inspection cuvettes 2 are moved with the aid of conveyor 11 to a second inspection location 900. At second inspection location 900 an optical inspection device 15, such as for example a camera, is arranged for performing a known optical inspection of the soft contact lenses for further deficiencies including (but not limited to) edge defects, inclusions, bubbles, fissures, flaws or the like. After optical inspection for further deficiencies carrier 13 and the inspection cuvettes 2 may then automatically be further transported towards a packaging module. For removing the inspected soft contact lenses from the inspection cuvettes 2, carrier 13 is tilted back to the horizontal position so that and inspection cuvettes 2 are arranged in the handling position. The soft contact lenses are then removed from the inspection cuvettes 2 with the aid of grippers. The so removed soft contact lenses are then transferred by the grippers to a packaging module or, in case a lens has been considered as not fulfilling the required quality standard during inspection, the respective lens is disposed of.

Figure 2:
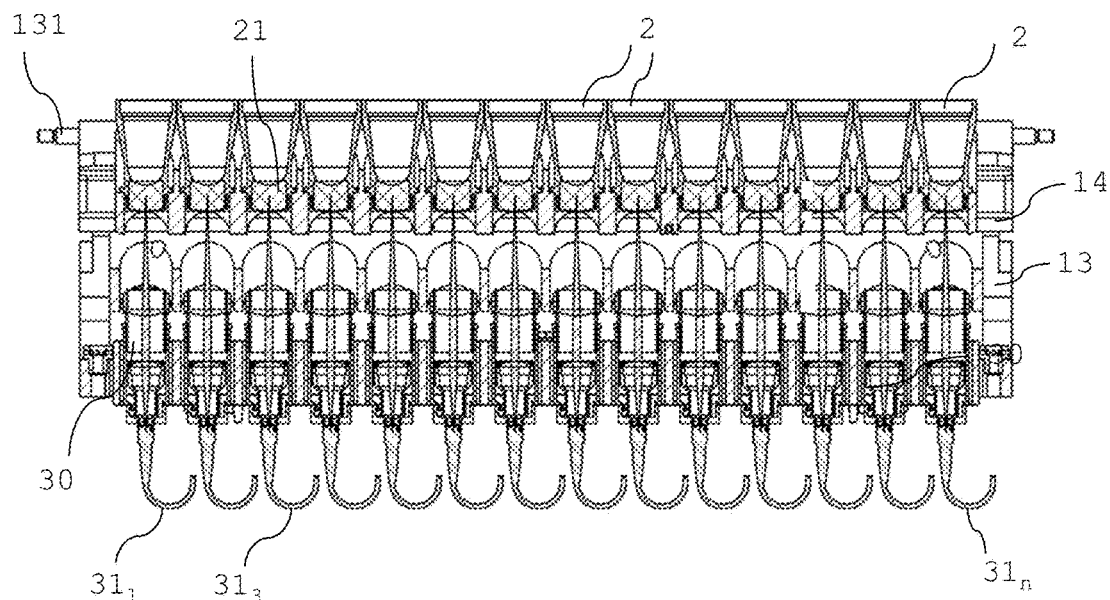
FIG. 2 shows a side view of a plurality of focusing probes and a plurality of inspection cuvettes.

FIG. 2 shows a carrier 13 with a plurality of inspection cuvettes 2 mounted thereto via an inspection cuvette holder 14. A plurality of focusing probes 30 is arranged below the inspection cuvettes 2. The number of focusing probes 30 corresponds to the number of inspection cuvettes 2.

A cross sectional view of an inspection cuvette 2 arranged above a focusing probe 30 is shown in FIG. 3. Inspection cuvette 2 is arranged in the inspection position, that is to say a channel 23 of the inspection cuvette 2 for introduction of a gripper to insert and remove a lens is tilted relative to the vertical axis. For engagement with a tilting mechanism the carrier is provided with pins 131 on each side of the carrier 13. A bottom 21 of the inspection cuvette 2 and a viewing glass 22 of the inspection cuvette 2 forming part of an inspection channel 24 are arranged on a vertical axis. Bottom 21 of inspection cuvette 2 is transparent and has a concave inner surface 210 to receive a lens (not shown) with its front surface to rest on concave inner surface 210. The outer surface 211 of transparent bottom 21 has a convex shape. Light for an interferometric measurement is incident from below the inspection cuvette 2 and passes through the transparent bottom 21 of the inspection cuvette 2.

Carrier 13 is arranged on a support 12 which is mounted to rack 10 (FIG. 1). Also the focusing probes 30 are mounted to rack 10 and support 12 such that a relative position of an inspection cuvette 2 and a corresponding focusing probe 30 is defined. The focusing probes 30 are mounted in a vertically adjustable manner, for example on a height adjustable mount 15 provided with a drive, such that through a vertical movement of the focusing probe 30 light may precisely be focused to a set position 310 of a lens at the center of concave inner surface 210 of bottom 21 of inspection cuvette 2. Thus, variations of the vertical distances between focusing probe 30 and inspection cuvette 2 can be compensated for.

Focusing probes 30 at their lower ends 330 are provided with a coupling 33 for an optical fiber 31. The focusing probes 30 are optically connected via these optical fibers 31 to an interferometer, such that light from the light source of the interferometer may be directed to focusing probes 30 and also directed back from focusing probes 30 to a receiving unit in the interferometer for performing the interferometric measurement and the determination of the center thicknesses of the lenses contained in the inspection cuvettes 2.

As can be seen in FIG. 3, light entering the focusing probe 30 at the lower end 330 is directed through an optical system 34 of focusing probe 30 out of the upper end 331 of focusing probe 30 and through openings 130, 140 in carrier 13 and inspection cuvette holder 14. The light further passes through transparent bottom 21 of inspection cuvette 2 and is focused to the set position 310 of the lens at the center of concave bottom 21 of inspection cuvette 2.

In FIG. 4, FIG. 5 and FIG. 6 details of the interferometric measurement are schematically illustrated for different measurement situations. FIG. 4 shows bottom 21 of the inspection cuvette with concave inner surface 210 and convex outer surface 211. A lens 5 inserted into the liquid (e.g. water), contained in inspection cuvette 2, floats downwards with its front surface 50 turned downwardly (FIG. 5). The shape of concave inner surface 210 of the bottom 21 of the inspection cuvette 2 matches to some extent with the shape of the convex front surface 50 of lens 5 in order to provide contact between lens 5 and bottom 21 in when the lens rests on inner surface 210 of the bottom 21 of the inspection cuvette (FIG. 6).

Light from below is directed through bottom 21 and is focused to the set position 310 of the lens at the center of the bottom of inspection cuvette 2. The light focused to set position 310 is schematically indicated by dashed lines 320. Set position 310 essentially corresponds to a distance above the concave inner surface 210 of the bottom of inspection cuvette 2 corresponding to half an average center thickness 55 of a lens when in contact with concave inner surface 210 of bottom 21 of inspection cuvette 2 (see FIG. 6). Alternatively, set position 310 may coincide with the center of concave inner surface 210 of the bottom 21 of the lens, or with the center of back surface 51 of the lens.

In FIG. 4 focused light is reflected only at the boundary 200 between concave inner surface 210 of bottom 21 of inspection cuvette 2 and the liquid contained in inspection cuvette. This reflected focused light is directed back through the focusing probe 30 to the receiving unit of the interferometer. The convex outer surface 211 of bottom 21 of the inspection cuvette generally does not provide a sufficient signal due to the outer surface 211 being arranged too far out of focus.

In FIG. 5 and FIG. 6 two measurement situations are shown that might occur during automated inspection of the lenses in the inspection cuvettes 2. In FIG. 5 the lens 5 has not yet settled onto concave inner surface 210 of bottom 21 of the inspection cuvette but is floating a short distance above concave inner surface 210. Therefore, light focused to the set position 310 is reflected back from the boundary 200 between the concave inner surface 210 of bottom 21 of the inspection cuvette and the liquid (see also FIG. 4).

Light is also reflected back from the boundaries 500, 510 of front surface 50 and back surface 51 of the lens 5 and the liquid. All three reflected light signals are within the depth of focus of the focused light and are directed back through the optical system 34 of focusing probe 30 to the receiving unit of the interferometer. In the interferometer the two reflected signals from the boundaries 500, 510 of the front surface 50 and back surface 51 of the lens 5 are superimposed to a reference signal to form an interference pattern which is then used to determine the center thickness 55 of the lens 5. The signal caused by the focused light reflected from boundary 200 between concave inner surface 210 of the bottom 21 of the inspection cuvette and the liquid is ignored. That is to say, in the measurement situation shown in FIG. 5 three reflection signals are received, however, the first one—that one corresponding to light reflected at the boundary of the concave inner surface 210 of bottom 21 of the inspection cuvette and the liquid—is ignored since it does not contain information that is useful for the determination of the center thickness of the lens.

As already mentioned above, the light is focused by focusing probes 30 such that it has a depth of focus spanning a range of several millimeters, so that focused light is also reflected at the boundaries 500,510 of the front surface 50 and back surface 51 of the lens floating at a small distance above concave inner surface 210 of the bottom 21 of the inspection cuvette.

In FIG. 6 a measurement situation is shown, where the lens 5 rests on concave inner surface 210 of the bottom 21 of the inspection cuvette. Focused light is reflected from the boundary 510 between back surface 51 of the ophthalmic lens 5 and the liquid and from the boundary 502 between concave inner surface 210 of bottom 21 of the inspection cuvette and front surface 50 of lens 5. In the measurement situation shown in FIG. 6, only two reflected light signals are generated which both carry information useful for the determination of the thickness of lens 5. These two reflected light signals are directed back to the interferometer for the determination of the center thickness of lens 5.

Figure 7:
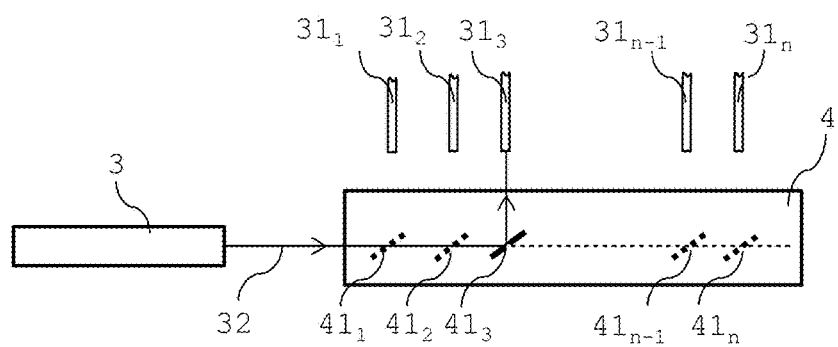
FIG. 7 is an illustration of a multi-switch directing the light from the interferometer to the individual focusing probes.

FIG. 7 shows a multi-switch 4 for directing light coming from the interferometer to a plurality n of focusing probes 30 (see FIG. 2) and for directing reflected light from the plurality n of focusing probes 30 back to the detector of the interferometer 3. Interferometer 3 is optically connected to each of the focusing probes 30 (see FIG. 2) via a plurality n of optical fibers 311, 312, 313, . . . , 31$n$-1, 31$n$ which are coupled to the plurality n of focusing probes 30. Multi-switch 4 comprises a plurality n of deflectors such as the mirrors 411, 412, 413, . . . , 41$n$-1, 41$n$ and is arranged between interferometer 3 and the plurality n of optical fibers. Mirrors 411, 412, 413, . . . , 41$n$-1, 41$n$ of multi-switch 4 are arranged in an optical path 32 formed by the light coming from the light source in the interferometer 3. Light reflected at the boundaries 500, 510 between lens 5 and the liquid contained in the inspection cuvette or light reflected at the boundary 502 between lens 5 and concave inner surface 210 and, if applicable, also light reflected at the boundary 200 between concave inner surface 210 and the liquid contained in the inspection cuvette (see FIG. 4 and FIG. 5), travels back along optical path 32 towards the detector of interferometer 3. Each one of the mirrors 411, 412, 413, . . . , 41$n$-1, 41$n$ is assigned to a respective one optical fiber 311, 312, 313, . . . , 31$n$-1, 31$n$. The mirrors may be switched from a passive state in which they allow light coming from the light source of interferometer 3 to pass on to the next mirror in the active state, in which the respective mirror directs light coming from the light source of the interferometer 3 into the respective optical fiber 311, 312, 313, . . . , 31$n$-1, 31$n$, and vice versa.

In FIG. 7, the interferometric measurements using mirrors 411 and 412 have already been completed. The third mirror 413 of the plurality of n mirrors is in the active state directing light from the interferometer 3 into the third optical fiber 313. The remaining mirrors 411, 412, 414 to 41$n$ of the multi-switch 4 are in the passive state, although it is also possible that only those mirrors which are arranged upstream of the first mirror 413 that is in the active state—viewed in the direction of the light coming from the light source of interferometer 3 (that is to say mirrors 411 and 412)—are in the passive state while those mirrors which are arranged downstream of first mirror 413 in the active state (that is to say mirrors 414 to 41$n$) may also be the active state. Once the interferometric measurement has been completed with mirror 413 in the active state, third mirror 413 is switched to the passive state (deactivated). The same interferometric measurement is then repeated with fourth mirror 414 being in the active state, and so on, until the interferometric measurement is performed with the last mirror 41$n$.

By sequentially activating and deactivating the mirrors, interferometric measurement and determination of the center thicknesses of all ophthalmic lenses contained in the plurality of inspection cuvettes is performed. Upon completion of all interferometric measurements, the plurality of inspection cuvettes can be moved from the first inspection location 800 in the inspection module 1, for example to second inspection location 900.

The mirrors of multi-switch 4 may be embodied as mirrors than can be pivoted into and out of the optical path 32, however, it is also conceivable that the mirrors are fixedly arranged in the optical path and that transparency of the mirrors is electronically controlled (mirrors in the passive state are transparent while mirrors in the active state are reflecting). This would eliminate the need for mechanically pivoting the mirrors.

While embodiments of the invention have been described with the aid of the drawings, various changes, modifications, and alternatives are conceivable without departing from the teaching underlying the invention. Therefore, the invention is not limited to the embodiments described but rather is defined by the scope of the appended claims.

The invention claimed is:

1. Method for an automated in-line determination of the center thickness (55) of an ophthalmic lens (5) in an automated manufacturing line for ophthalmic lenses, the method comprising the steps of:

providing an inspection cuvette (2) comprising an optically transparent bottom (21) having a concave inner surface (210) and containing the ophthalmic lens (5) immersed in a liquid, and positioning the inspection cuvette (2) at a first inspection location (800) of an inspection module (1) of the automated manufacturing line;

providing an interferometer (3) comprising a light source and a focusing probe (30), the focusing probe focusing light coming from the light source to a set position (310) of the ophthalmic lens at the center of the concave inner surface of the optically transparent bottom of the inspection cuvette, and the focusing probe (30) further directing light reflected at the boundary (510) between the back surface (51) of the ophthalmic lens and the liquid as well as light reflected at the boundary (500) between the front surface (50) of the ophthalmic lens and the liquid or light reflected at the boundary (502) between the front surface (50) of the ophthalmic lens (5) and the concave inner surface (210) of the optically transparent bottom (21) of the inspection cuvette (2) to a detector of the interferometer (3);

determining the center thickness (55) of the ophthalmic lens (5) from the signals generated at the detector by the light reflected at the respective boundary (510; 500, 502) at the back surface (51) and at the front surface (50) of the ophthalmic lens (5), and wherein the step of determining the center thickness (55) of the ophthalmic lens (5) comprises counting the number of signals generated by the light reflected at the respective boundary (510; 500,502), and for a counted number of two signals, selecting the two signals for determining the center thickness (55) of the ophthalmic lens (5), for a counted number of three signals, ignoring the signal corresponding to the light reflected at the boundary (200) between the concave inner surface (210) of the optically transparent bottom (21) of the inspection cuvette (2) and the liquid, and selecting the remaining two signals for determining the center thickness (55) of the ophthalmic lens (5).

2. The method according to claim 1, further comprising the steps of comparing the determined center thickness (55) of the ophthalmic lens (5) with a predetermined set value for the center thickness and identifying the ophthalmic lens (5) as having an unacceptable center thickness if the determined center thickness (55) is outside a predetermined range of tolerance around the predetermined set value for the center thickness, or identifying the ophthalmic lens (5) as having an acceptable center thickness if the determined center thickness (55) is within the predetermined range of tolerance around the predetermined set value for the center thickness, and removing the ophthalmic lens (5) from the manufacturing line in case the ophthalmic lens has been identified as having an unacceptable center thickness (55), but further processing the ophthalmic lens (5) in the manufacturing line in case the ophthalmic lens (5) has been identified as having an acceptable center thickness (55).

3. The method according to claim 1, further comprising the steps of:

providing a plurality of inspection cuvettes (2), each inspection cuvette (2) comprising an optically transparent bottom (21) having a concave inner surface (210) and containing an ophthalmic lens (5) immersed in a liquid, and positioning the plurality of inspection cuvettes (2) at the first inspection location (800) of the inspection module (1);

providing a plurality of focusing probes (30) corresponding to the plurality of inspection cuvettes (2), each of the focusing probes (30) focusing light to a set position (310) of the ophthalmic lens (5) at the center of the concave inner surface of the optically transparent bottom of a corresponding inspection cuvette (2), and each of the focusing probes (30) directing light reflected at the respective boundary (510; 500,502) at the back surface (51) and at the front surface (50) of the respective ophthalmic lens (5) to the detector of the interferometer (3); and determining the center thickness (55) of each ophthalmic lens (5).

4. The method according to claim 3, wherein focusing light to the set position (310) of the ophthalmic lens (5) is performed sequentially for the plurality of inspection cuvettes (2) by directing light from the light source of the interferometer (3) via a first focusing probe (30) of the plurality of focusing probes to the set position (310) of the ophthalmic lens (5) contained in a first inspection cuvette (2) of the plurality of inspection cuvettes, subsequently directing light from the light source of the interferometer via a second focusing probe (30) to the set position of the ophthalmic lens (5) contained in a second inspection cuvette (2) of the plurality of inspection cuvettes, and so on, until light from the light source of the interferometer (1) is directed via a last focusing probe (30) of the plurality of focusing probes to the set position (310) of the ophthalmic lens (5) contained in a last inspection cuvette (2) of the plurality of inspection cuvettes.

5. The method according to claim 4, wherein sequentially focusing light to a set position (310) of the ophthalmic lens (5) for the plurality of inspection cuvettes (2) comprises providing a plurality of deflectors ($41_1$, $41_2$, $41_3$, ..., $41_{n-1}$, $41_n$) corresponding to the plurality of focusing probes (30), the individual deflectors of the plurality of deflectors ($41_1$, $41_2$, $41_3$, ..., $41_{n-1}$, $41_n$) each being capable of being switched between an active state, in which the respective deflector ($41_1$, $41_2$, $41_3$, ..., $41_{n-1}$, $41_n$) directs light coming from the light source of the interferometer to the corresponding focusing probe (30) and in which the respective deflector ($41_1$, $41_2$, $41_3$, ..., $41_{n-1}$, $41_n$) directs light reflected at the respective boundary (510, 500,502) to the detector of the interferometer (3), and a passive state, in which the respective deflector allows the light coming from the light source to pass to the next deflector which is in the active state and which is arranged in an optical path of the light, and sequentially switching a first deflector ($41_1$) of the plurality of deflectors ($41_1$, $41_2$, $41_3$, ..., $41_{n-1}$, $41_n$) from the active state to the passive state after determining the center thickness (55) of the ophthalmic lens (5) contained in the first inspection cuvette (2), switching a second deflector ($41_2$) of the plurality of deflectors ($41_1$, $41_2$, $41_3$, ..., $41_{n-1}$, $41_n$) from the active state to the passive state after determining the center thickness (55) of the ophthalmic lens (5) contained in the second inspection cuvette (2), and so on, until switching a second last deflector ($41_{n-1}$) of the plurality of deflectors $41_1, 41_2, 41_3, \ldots, 41_{n-1}, 41_n$) from the active state to the passive state after determining the center thickness (55) of the ophthalmic lens (5) contained in the second last inspection cuvette (2), and then determining the center thickness (55) of the ophthalmic lens contained in the last inspection cuvette (2) with the last deflector ($41_n$) being in the active state.

6. The method according to claim 3, further comprising the steps of
    after determination of the center thickness (55) of the ophthalmic lens (5) contained in the inspection cuvette (2) or after determination of the center thicknesses (55) of the ophthalmic lenses (5) contained in the plurality of inspection cuvettes (2), moving the inspection cuvette (2) containing the ophthalmic lens (5) or the plurality of inspection cuvettes (2) containing the ophthalmic lenses (5) from the first inspection location (800) to a second inspection location (900), and
    at the second inspection location (900) performing an in-line optical inspection of the ophthalmic lens (5) contained in the inspection cuvette (2) or of the ophthalmic lenses (5) contained in the plurality of inspection cuvettes (2) for the presence of other deficiencies.

7. The method according to claim 3, further comprising the step of individually adjusting each focusing probe (30) of the plurality of focusing probes so as to focus light coming from the light source of the interferometer (3) to the corresponding set position (310) of the ophthalmic lens (5) at the center of the concave inner surface (210) of the optically transparent bottom (21) of the respective inspection cuvette (2) of the plurality of inspection cuvettes (2).

8. The method according to claim 1, wherein the method is performed in an automated manufacturing line for manufacturing soft contact lenses.

9. An automated manufacturing line for manufacturing ophthalmic lenses (5), the manufacturing line comprising:
    a production module for manufacturing ophthalmic lenses (5);
    an inspection module (1) for inspecting the manufactured ophthalmic lenses (5), the inspection module (1) comprising an interferometer and a plurality of focusing probes (30) being arranged at a first inspection location (800) and being capable of being optically connected to the interferometer (3), for inspection of ophthalmic lenses (5) being contained in a plurality of inspection cuvettes (2) corresponding to the plurality of focusing probes (30), each inspection cuvette (2) comprising an optically transparent bottom (21) having a concave inner surface (210) and containing the ophthalmic lens (5) immersed in a liquid,
    wherein in operation the inspection module (1) performs the method according to claim 1.

* * * * *